Sept. 21, 1943.  E. W. CHRISTY ET AL  2,329,879
METHOD AND MACHINE FOR GENERATING SAW TEETH
Filed Sept. 23, 1940  9 Sheets-Sheet 1

Fig. 1

INVENTORS.
*Elmer W. Christy.*
BY *William S. Dickson.*
*Murray, Sachhoff & Paddack.*
ATT'ys.

INVENTORS.
Elmer W. Christy.
William S. Dickson
BY Murray, Sachhoff & Paddack.
ATT'ys.

Sept. 21, 1943.  E. W. CHRISTY ET AL  2,329,879
METHOD AND MACHINE FOR GENERATING SAW TEETH
Filed Sept. 23, 1940    9 Sheets-Sheet 9

INVENTORS.
Elmer W. Christy.
BY William S. Dickson.
Murray, Sackhoff & Paddock.
ATT'YS.

Patented Sept. 21, 1943

2,329,879

UNITED STATES PATENT OFFICE 2,329,879

METHOD AND MACHINE FOR GENERATING SAW TEETH

Elmer W. Christy and William S. Dickson, Hamilton, Ohio

Application September 23, 1940, Serial No. 357,968

10 Claims. (Cl. 76—41)

The present invention relates to a method and means for saw tooth generation and has for its primary object the simplification of manufacture and maintenance of wood cutting saws.

Another object of the invention is to provide a method of manufacturing and conditioning saws that is productive of absolute uniformity of the teeth and of the spacing thereof.

A further object is to provide a machine whereby the method may be carried out automatically for any selected shape and size of saw tooth and for any number of points per inch of saw blade.

A still further object of the invention is to provide an automatic spacing mechanism that is readily adjustable to selected spaces.

These and other objects are attained by the method and means herein described and fully disclosed in the accompanying drawings, in which.

In the manufacture of hand saws for wood cutting it is customary to initially notch the teeth in the edge of the blade on a punch press using a spacing device corresponding to the pitch required. In all subsequent operations necessary to finish the teeth, the notched teeth on the blade are used for spacing and the depth of the tooth is determined only by filing until a point is obtained. Lack of complete uniformity in all respects in the teeth of a given saw is inevitable in spite of the remarkable skill of the highly specialized mechanics employed by the saw manufacturers.

In the maintenance and reconditioning of saws no positive way is provided whereby the teeth angles or the spacing or the height of the teeth may be preserved, since all of these are dependent on the skill of the maintenance mechanic. Machines and mechanical devices as aids to the reconditioning of saws have been known and used but these have been designed principally in an endeavor to mechanically duplicate the motion of hand filing. This general class of devices affords no truly corrective steps in saw maintenance and in some of them there is apparently a tendency to augment initial irregularities.

Our present invention in practice attains that high degree of uniformity in the saw teeth which is otherwise unattainable. Particularly are the factors of spacing, height of tooth, depth of tooth and the angles accurately generated on the successive teeth with speed and dispatch. The method and means are arranged for universal use in the manufacture and maintenance of all tooth sizes and in any desired number of points per inch so that any of the hand saws for wood cutting can be accommodated.

We have found that after having attained actual uniformity in tooth size, shape and spacing in the saw, the saw cuts more smoothly, more accurately and faster with less effort applied to the stroke and that these advantages are the result of equal distribution of tooth duty made possible by the aforesaid uniformity of the teeth and the tooth spacing.

By the method of the invention the saw upon which teeth are to be initially generated or merely reconditioned is rigidly clamped against movement and the cutting agent is intermittently spaced, independently of any existing teeth or tooth notches on the saw, to attain the desired tooth spacing. The angles on adjacent faces of adjacent teeth are simultaneously generated while the cutting agent is fed to a positive depth into the edge of the blade while being held in its selected angular position.

The machine of the invention is arranged to positively and quickly adjust to selected spacing and tooth angles and the depth of cut is selected by the adjustment of the edge of the saw toward or away from the field of action of the cutting agent. The machine includes an independently powered unit for the cutting agent and a separate power drive for the mechanism which automatically manipulates the cutting unit relative to the saw from one end to the other completing a tooth in each movement of the cutting agent.

The machine comprises a rigid support frame 30 which is desirably a one-piece casting with integral end pieces 31 between which extend rigidly connected guide rods 32 and 33 which are parallel to the front longitudinal member 34 of the frame 30. The member 34 has a pair of forwardly extending brackets 35 with guide grooves 36 cut therein to slidably receive the complementary guide pieces 37 to which the saw table 38 is attached and whereby said table is maintained with its top horizontal face and its forward edge parallel with the guide rods 32 and 33. A table feed screw 39 is journalled for manual rotation in the front member 34 and is threadedly engaged in a depending lug 40 on the table 38 midway between the guide pieces 37. A clamp 41 has vertical bores near its opposite ends to receive the fixed upright screws 42 in the table 38 and clamping nuts 43 are used to tighten the clamp 41 on an inserted saw blade and positively retain the saw horizontally and with its toothed edge toward the rear of the machine. As will be hereafter fully understood, the saw teeth generated by the machine will have the points of the teeth and the bottoms of the gullets respectively in parallel lines which are also parallel with the guide rods and with the front faces of the saw table and clamp. Various depths of gullets or heights of saw tooth are provided for in the horizontal movement of said table 38 by adjustment of screw 39.

A carriage 44, desirably in the form of a hollow casting has the guide rods 32 and 33 passing through bores in its opposite ends and has a bearing 45 midway between its ends riding on the guide rod 33, while the guide rod 32 finds its bearing at the opposite ends of the carriage which is thus slidable in parallelism with the saw table 38. The guide rod 32 has a spacing rack 46 attached to or integral with it and the carriage has a pinion 47 meshing with said rack and fixed on a shaft 48 which is journalled in the carriage. Shaft 48 also has a pinion 49 fixed thereon and meshing with a pinion 50 on shaft 51 which extends up through the top of the carriage where it receives its tooth spacing power feed through the means hereinafter described.

We also provide for rapid manual traverse of the carriage over the guide rods by a pinion 52 on shaft 53 which has a hand wheel 54 at the top.

Figure 1:
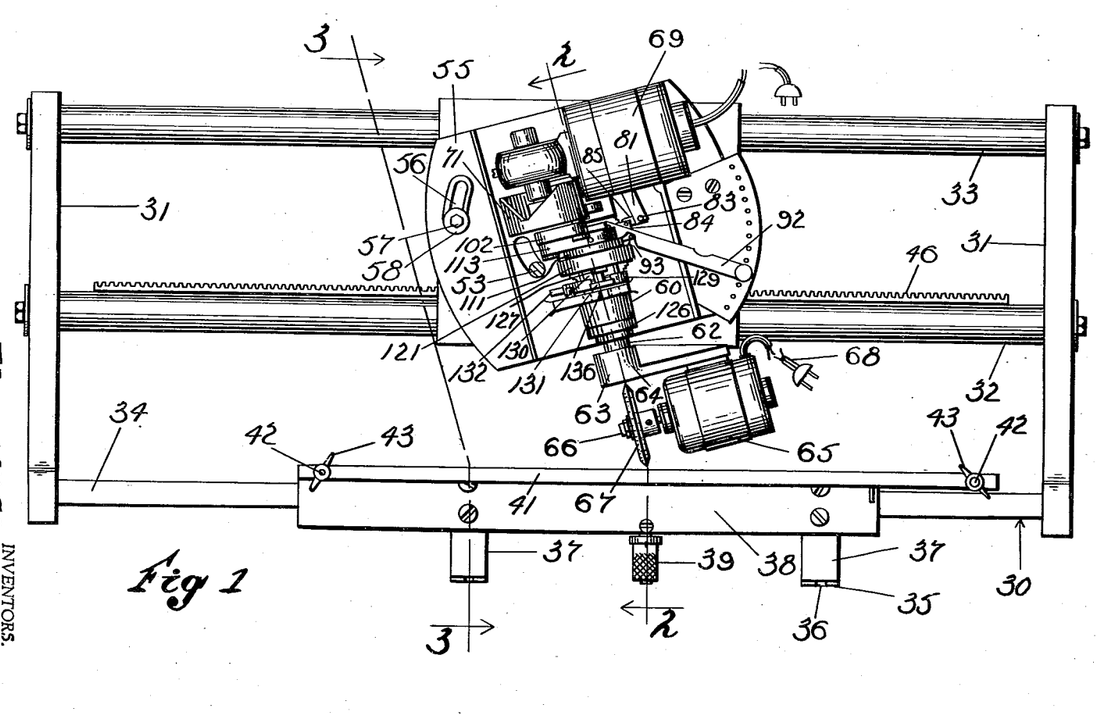
Fig. 1 is a top plan view of a machine of the invention having the cover casing removed and showing the operating mechanism in its central and fully retracted position.
Figures 2, 23, 24:
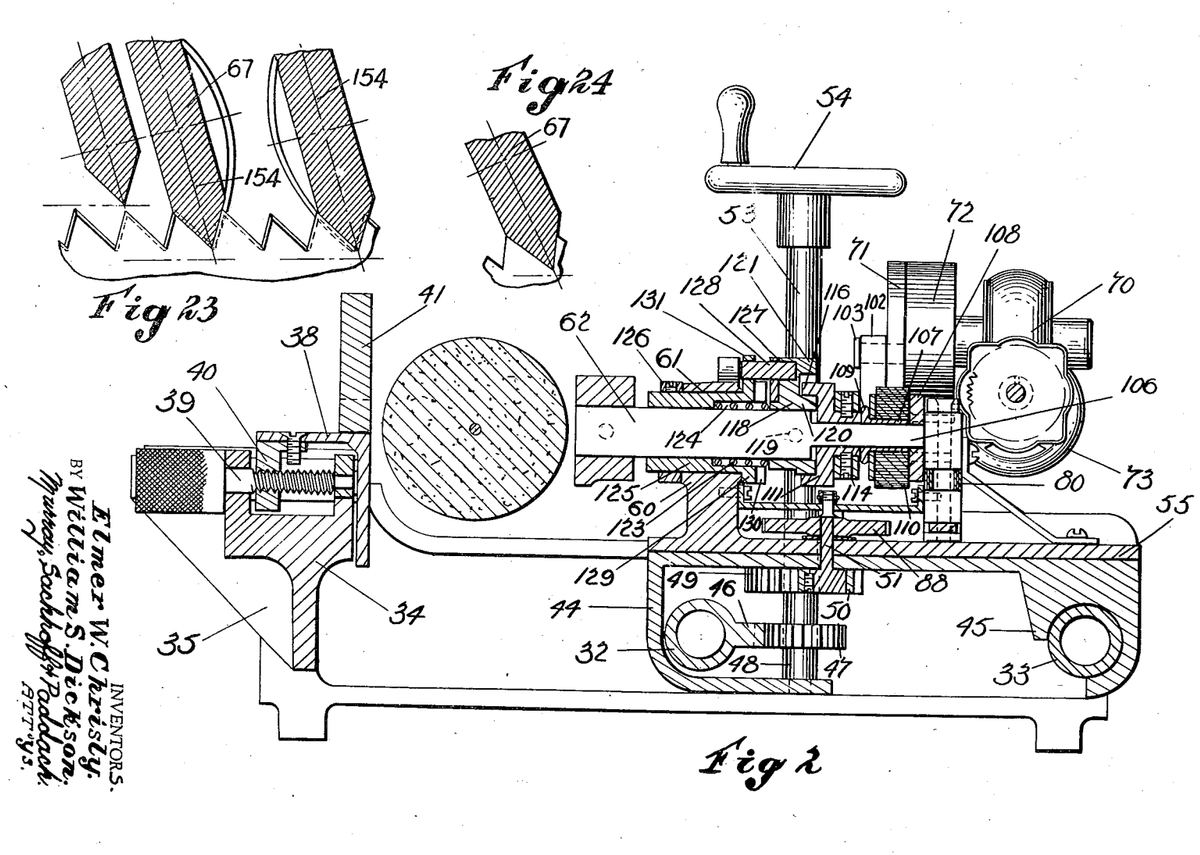
Fig. 2 is an enlarged cross sectional view taken on line 2—2 of Fig. 1.
Fig. 23 is a schematic view showing in enlarged elevation the teeth of a cross cut saw and the relative position of the cutter at different times in the operation of the machine.
Fig. 24 is a similarly schematic view showing teeth of a rip saw and the relation of the cutter thereto.
Figure 3:
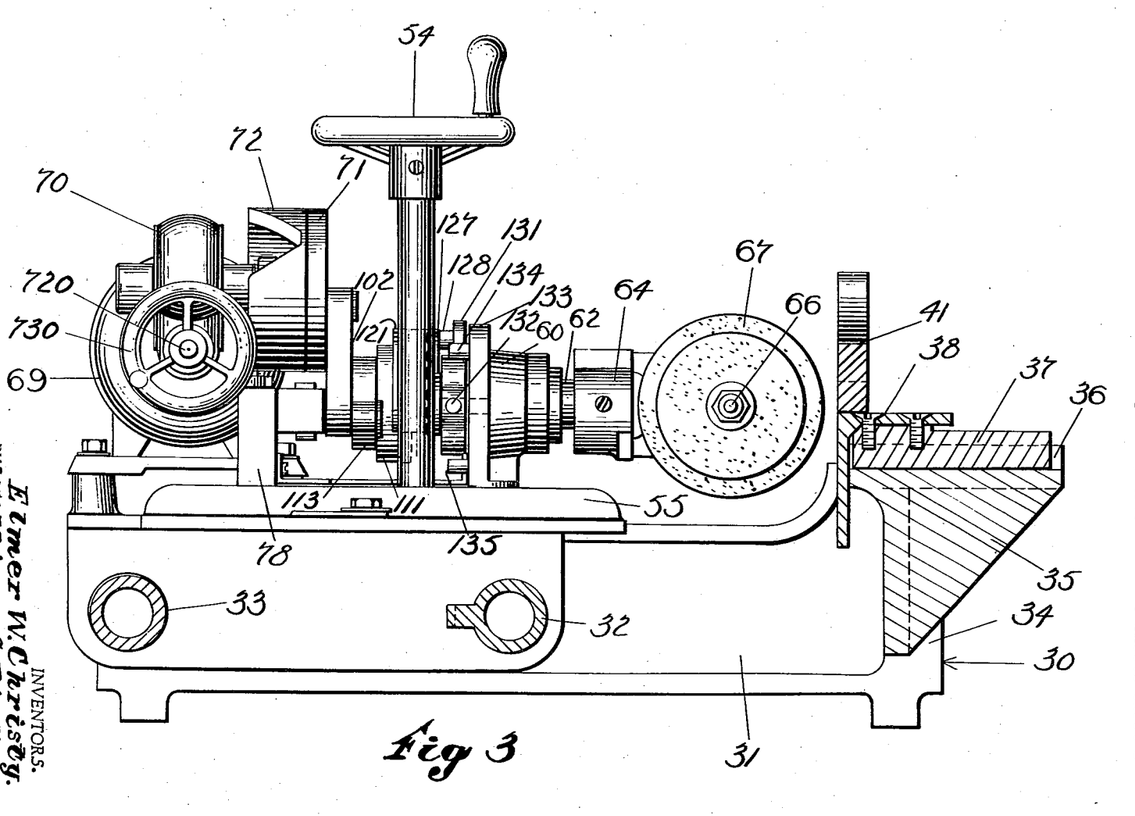
Fig. 3 is an enlarged elevational view taken on line 3—3 of Fig. 1.
Figure 4:
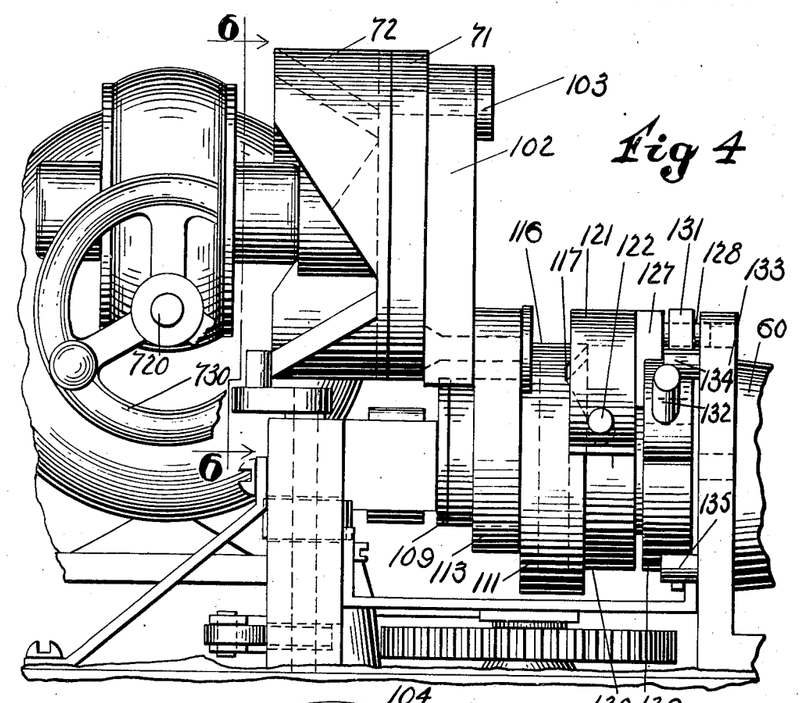
Fig. 4 is an enlarged fragmental side elevational view showing the relation of parts at one limit of oscillatory movement.
Figures 5, 7:
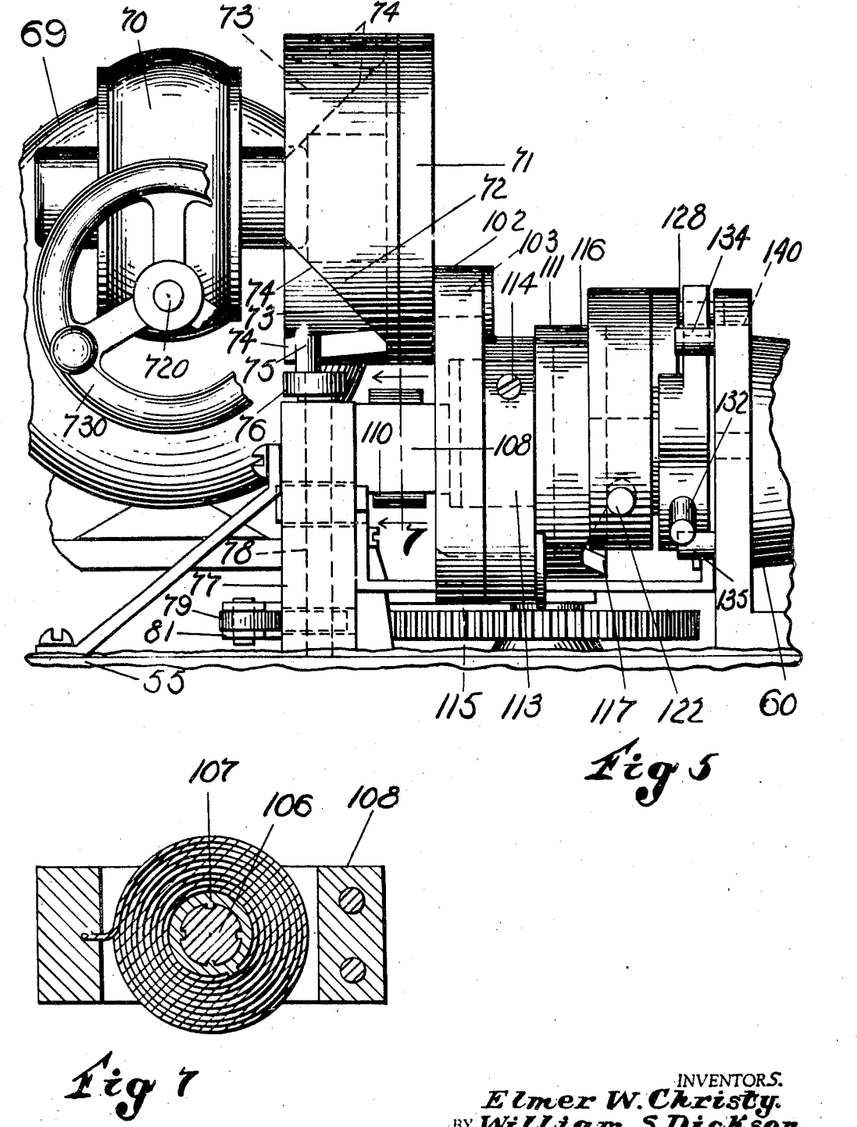
Fig. 5 is a view similar to Fig. 4 but showing the parts at the opposite limit of oscillatory movement.
Fig. 7 is a cross-sectional view taken on line 7—7 of Fig. 5.

Mounted on top of the carriage 44, and adjustable in a horizontal plane about shaft 51 as a center, is a swivel base 55 (see Fig. 2). The base 55 has at least one arcuate slot 56 passing a clamping bolt 57 that is fixed in the carriage and receives a clamping nut 58 to hold said swivel base in angularly adjusted position. An arcuate slot 59 provides clearance for the shaft 53. (See Fig. 1.)

The swivel base has an upright bearing boss 60 with a horizontal bore 61 through which passes a main shaft 62 in such position that the axis of shaft 62 is always in a critical horizontal plane which will pass through the mid-thickness of a saw-blade clamped on table 38. It will be noted also the line of the axis of shaft 51 continued upwardly will intersect at right angles with the axis of main shaft 62. Shaft 62 has predetermined endwise reciprocation imparted thereto and also a selective oscillatory movement by means hereinafter explained. On the forward end of shaft 62 is fixed a cutter unit bracket 63 with a mounting surface 64 at right angles to the axis of the shaft. A small high-speed motor 65 has its shaft 66 mounted for rotation without end play, any suitable construction such as ball bearing (not shown) being employed. The axis of the motor shaft 66 is also arranged to intersect at right angles the line of the axis of main shaft 62 and the cutting agent 67 which may be of any suitable material, is in this embodiment an abrasive wheel with a double beveled edge having a 60° included angle and so mounted that a major diameter which bisects the said 60° angle also coincides with the extension of the axis of shaft 62. Thus, when the shaft 62 is oscillated about its axis, the wheel is bodily tilted about a horizontal diameter of the wheel which is a continuation of the axis of shaft 62. The cutter motor 65 is independently energized through feed lines 68.

The power means providing for the cyclic operation of the adjustable tooth spacing carriage movement and the movement of the main shaft comprises a separately energized motor 69 mounted on swivel base 55 and having a speed reducer assembly 70 which serves to slowly rotate a power disc 71 which is fixed on the power take-off end of the speed reducer. An auxiliary shaft 720 with a hand wheel 730 is provided to afford manual rotary adjustment of the disc when the motor 69 is de-energized.

On one face of power disc 71 is an annular face cam 72 which provides the power movement for the carriage spacing mechanism. On diametrically opposite sides of the cam 72 are relatively deep wide cam grooves 73 the inclined faces 74 of which control the in and out movement of a pin 75 that is fixed in the free end of a bell crank lever arm 76. The arm 76 is fixed to a vertical stud 77 which is journalled in a block 78 on the swivel base 55. Near the bottom of stud 77 is fixed the other arm 79 of the bell crank. A coil spring 80 surrounds stud 77 and is attached thereto at one end while the other end is suitably secured to the block 78. The tension of spring 80 yieldingly urges pin 75 toward the face cam. As can be best seen in Fig. 8, a link 81 is connected at one end to the end of arm 79 while the other end of link 81 is pivoted to a bell crank arm 82 by pivot 83. The bell crank arm 82 is pivoted within the U-shaped end of a pawl carrier plate 84 on a pivot 85. The bell crank arm 86 has at its free end a 90° included angle groove with a 90° tooth on either side and this constitutes the toothed pawl 87 which cooperates with the 90° teeth on wheel 88 which is keyed to the shaft 51 above the swivel base 55. The pawl carrier plate 84 has spring tensioned friction on the fixed plate 89 so that the carrier plate will pivot about the tapered friction shoulder 90 when moved by a force superior to that of the tension spring 91 but will not partake of the rotary movement of shaft 51. A space adjuster lever 92 is pivoted on plate 89 and has a notch 93 in which the upstanding pin 94 on plate 84 engages as a selective stop to the return movement of the carrier plate 84 under the influence link 81 and the spring 80.

Figures 11, 12, 13, 20:
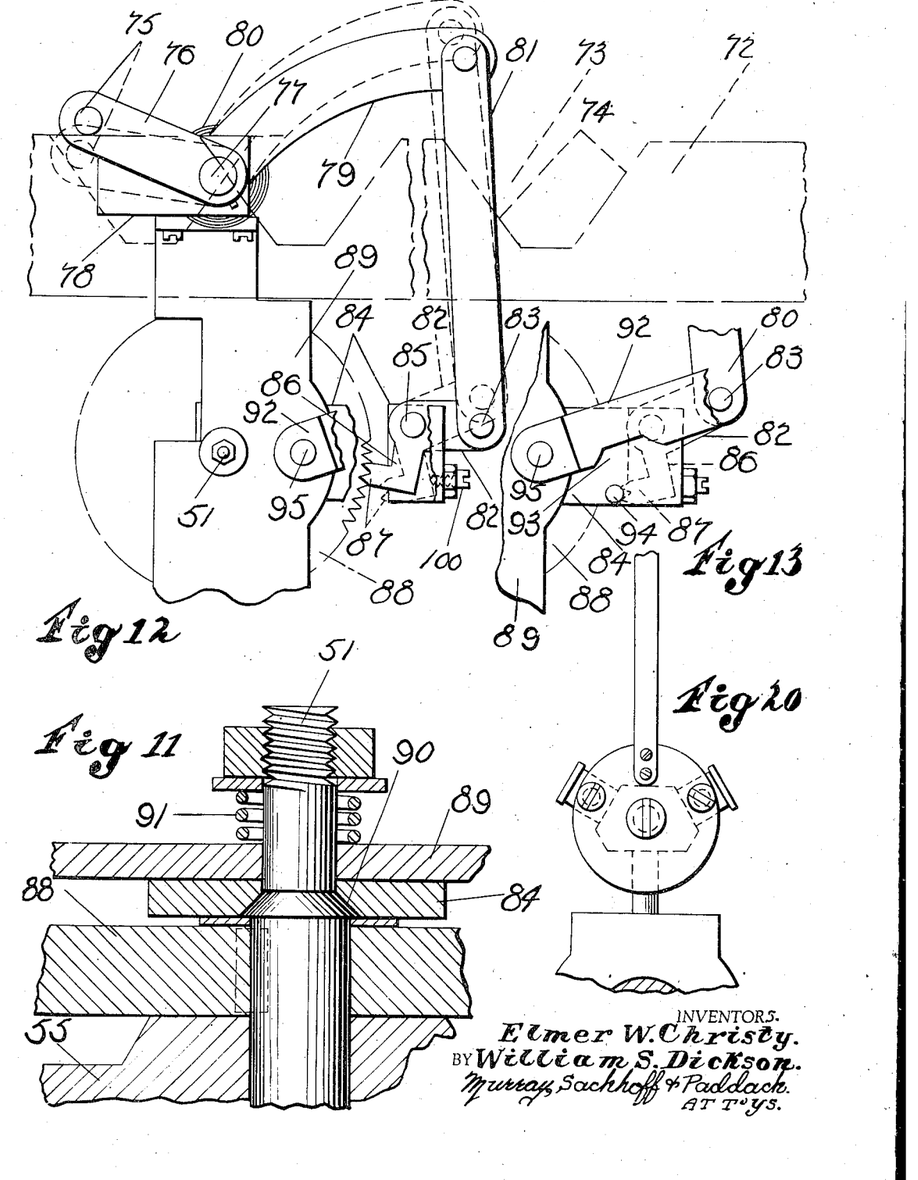
Fig. 11 is an enlarged cross-sectional view taken on line 11—11 of Fig. 8.
Fig. 12 is a plan view showing the automatic spacing means at the end of a spacing movement, parts being broken away and in long dash lines showing a development of the power cam as related thereto, said view showing in dotted line the position of parts in the initial spring actuated release movement of said spacing means with the advanced position of the power cam shown in short dash lines.
Fig. 13 is a fragmentary showing in full lines those parts that are broken away in Fig. 12.
Fig. 20 is a cross-sectional view taken on line 20—20 of Fig. 18.
Figures 14, 15:
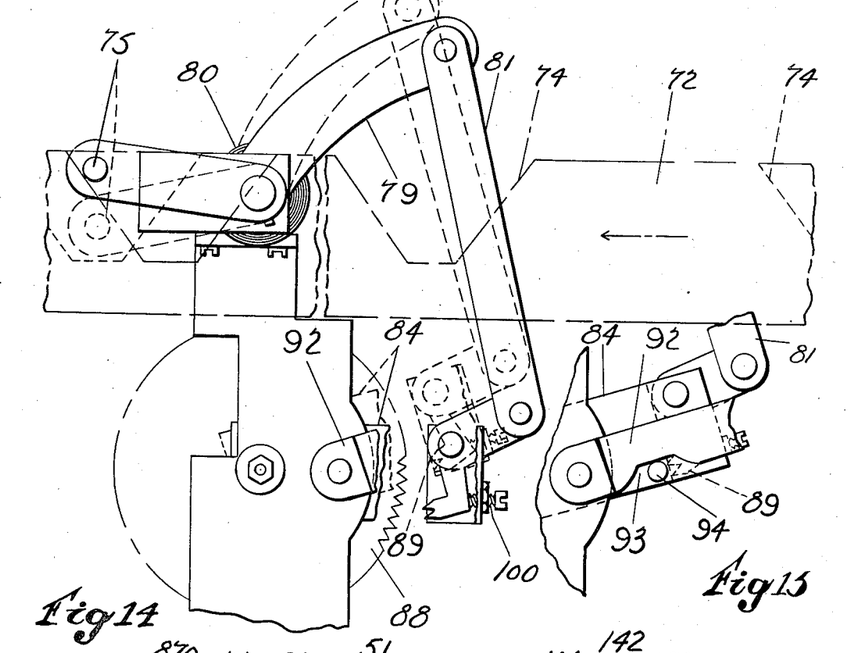
Fig. 14 is a view similar to Fig. 12 but showing the said parts in said initial spring actuated release position, and showing in dotted lines the same parts in retracted position, ready for engagement under the power of the cam.
Fig. 15 is a fragmental view showing the relation of dotted line and broken away parts of Fig. 14.

Reference is now made particularly to Figs. 12 and 14 which show the movements of the adjustable carriage feed for the selective tooth spacing movement of the machine. In Figs. 12 and 14 a development of the cam 72 is laid out schematically in long dash lines in correspondence with the full line showing of the feed linkage, while the short dash line showing of the inclines 74 correspond with the dotted line showing of the linkage. As is best seen in Fig. 14 the dotted line showing of pin 75 clearly shows said pin out of contact with cam face 74 because the spring 80 has pulled pawl carrier plate 84 back until the pin 94 is seated in notch 93 in the lever 92. Fragmental view, Fig. 15, shows the broken away parts restored and in full lines. When the movement of the cam 72 again causes pin 75 to engage and ride upon the incline 74 the first movement of link 81 will cause the bell crank pawl 82—87 to turn on its pivot 85 and engage the toothed pawl 87 on the radial teeth of toothed wheel 88 and then the link 81 continues its movement pushing the pawl carrier plate 84 and positively turning the toothed wheel until pin 75 reaches the top flat of cam 72. During that interval the shaft 51 was rotated a preselected definite amount and the carriage was moved a definite interval. When pin 75 reached the top flat of the cam, the pawl and pawl carrier were in the position shown in full lines in Fig. 12. The parts remain in that position with the carriage at rest in its advanced position during the interval in which said pin 75 is riding over the said flat outer or top part of the cam. If the cam can be brought to rest while the parts are in said position it is possible to move the carriage by means of the hand wheel 54 if desired or necessary as in returning the carriage to a starting position for a new piece of work.

The ready selection of a desired feed movement of the carriage is effected by adjusting the lever 92 about its pivot 95 and holding it by suitable means so that when link 81 pulls the pawl carrier plate 84 back under the influence of spring 80, the pin 94 engaging in notch 93 as a stop will limit the retractive movement of the pawl and its carrier to the desired degree and in its power stroke the toothed pawl 89 will initially engage the toothed wheel 88 a predetermined number of teeth away from the forward limit of pawl movement.

As previously indicated the teeth on wheel 88 are each laid out with a radius of the wheel bisecting the angle of the tooth and the engaging and disengaging movement of pawl 89 is also on the radius of such tooth so that the pawl will move always the wheel 88 exactly the same distance each time under a given setting of lever 92.

Figures 6, 17:
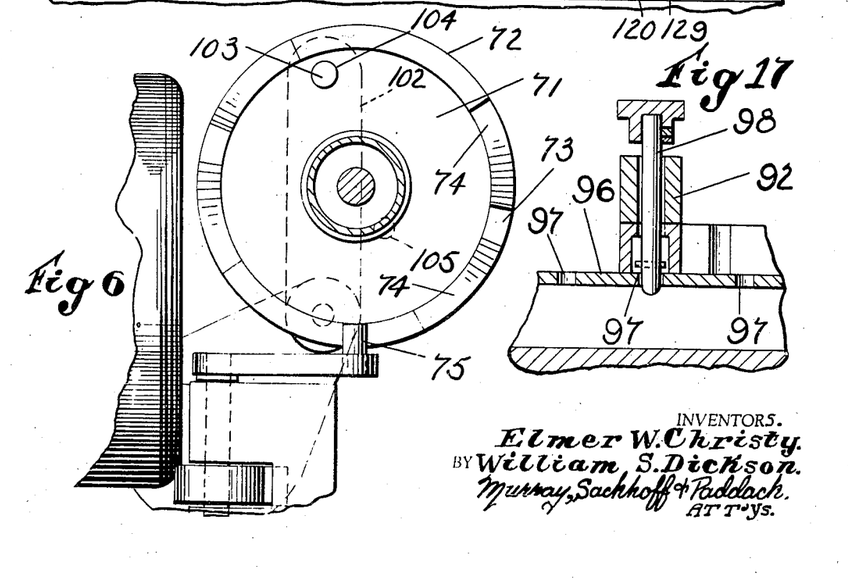
Fig. 6 is a view taken on line 6—6 of Fig. 4.
Fig. 17 is a cross-sectional view taken on line 17—17 of Fig. 8.
Figures 8, 9, 10:
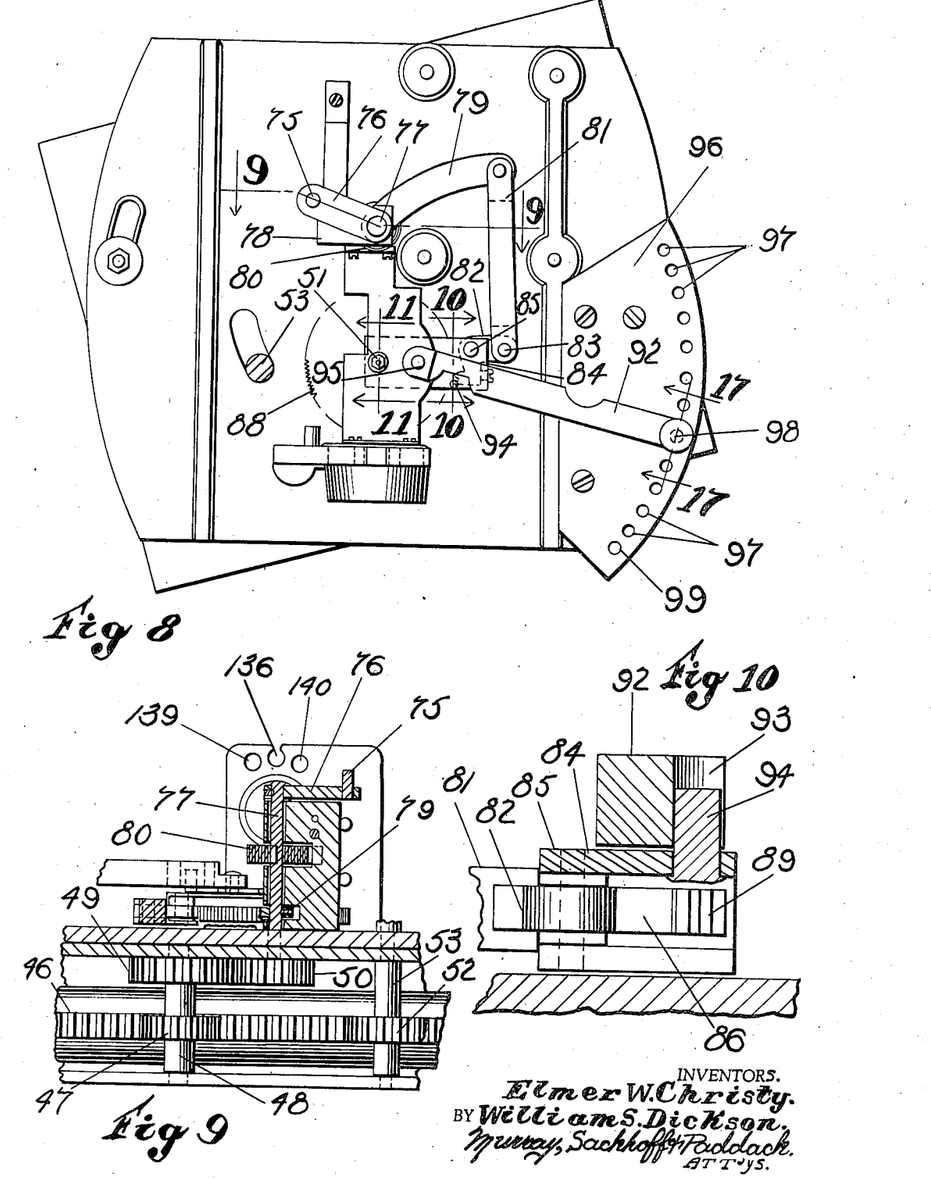
Fig. 8 is a top plan view of the carriage structure of the invention with the uppermost parts removed to disclose the adjustable automatic carriage spacing mechanism.
Fig. 9 is a cross-sectional view taken on line 9—9 of Fig. 8.
Fig. 10 is a cross-sectional view taken on line 10—10 of Fig. 8.

The means for rapid selection and adjustment of the lever 92 are best seen in Figs. 8 and 17, wherein an index plate 96 has a series of bores 97 locating positions for lever 92 for producing selected amounts of carriage spacing in terms of points per inch of saw desired. The lever 92 has a vertically movable pin 98 which may be lowered and raised into and from a selected bore 97 to secure the desired necessary radial adjustment of the lever. A forwardly disposed bore 99 in plate 96 serves to locate lever 92 by means of its pin 98 in a zero position wherein no travel of the pawl carrier is effected because notch 93 holds pin 94 at its forwardly limit of movement and pin 75 is held against entry into the cam grooves 73 as the same pass by the pin on rotation of cam 72. The adjusting abutment screw 100 serves to accomplish perfect mating of the pawl and toothed wheel.

Figures 16, 18, 19:
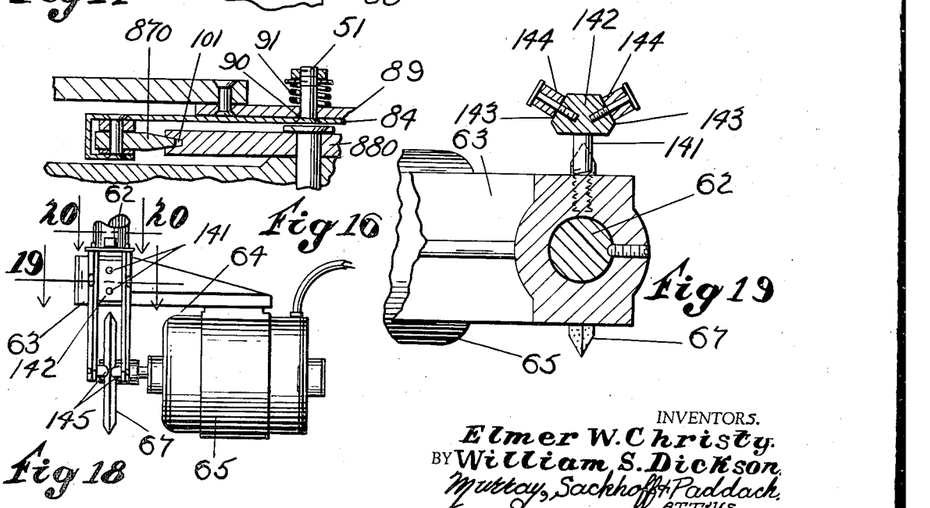
Fig. 16 is a sectional view showing a modification of the spacing mechanism employing a wedge pawl and grooved wheel in lieu of the toothed pawl and wheel of Figs. 12 to 15.
Fig. 18 is a top plan view of the cutter unit showing the wheel truing device mounted in position.
Fig. 19 is a cross-sectional view taken on line 19—19 of Fig. 18.

In Fig. 16 there is shown a modification of the spacing wheel and pawl structure that is made for infinitely variable spacing adjustment instead of a wide range of predetermined spacing as shown in the device of Fig. 8. In this modification the pawl 870 is wedge shaped in cross-section instead of being toothed as in the case of pawl 87. The wheel 880 has a peripheral groove 101 with inclined side-walls matching the bevel of pawl 870. The angle of the side-walls of the groove and pawl provide a wedging taper. The parts are otherwise identical and are indicated with reference characters identical with the corresponding parts in Figs. 8, 12 and 13. The abutment screw 100 of Fig. 14 is omitted in the modification shown in Fig. 16.

In order to attain fully synchronized tooth forming operations in conjunction with the selective tooth spacing carriage moving mechanism hereinbefore described, the rotary movement of power disc 71 is utilized to drive a pitman 102 which may be pivoted by threaded pin 103 in a threaded bore 104 near the periphery of disc 71 in order to attain a cyclic oscillating and reciprocating movement of main shaft 62 for generating the characteristic cross cut teeth on a saw. The pitman 102 may also be pivoted by threaded pin 103 located in a threaded bore 105 located relatively close to the center of disc 71 (see Fig. 6) in order to attain reciprocating motion only in the main shaft 62 for generating the characteristic teeth on a rip saw.

Referring to Fig. 2 it will be noted that main shaft 62 has a rear end section 106 of reduced diameter (see Fig. 2) on which is splined a thimble 107 which has a bearing in opposite sides of a hollow block 108. The thimble has a flange 109 seating against the outside face of block 108 and the thimble is arranged to oscillate with shaft 62 and the shaft may reciprocate within said thimble. A spring 110 is secured at one end to the periphery of the thimble about which the spring is coiled and the other end is secured to the block. The spring is tensioned so as to counterbalance the weight of bracket 64 and motor 65 thereon at the opposite end of shaft 62 (see Figs. 1, 2, 5 and 7).

A rocker cam member 111 has an extended hub 112 which is oscillatable on the reduced end 106 of shaft 62 and which has an end bearing on the flange 109 of the thimble. On hub 112 is fixed a crank arm 113 by any suitable means such as set screws 114. The free end of the crank 113 is pivoted to the end of pitman 102 by a pin 115.

Cam member 111 has an annular flange 116 cut away at diametrically opposite sides to provide cam faces 117.

Cooperating with the cam member 111 is a complementary cam member 118 which is fixed to shaft 62 by a pin or set screw at 119. Member 118 has an annular flange 120 which enters slidably beneath the annular flange 116 of cam member 111. Concentric with flange 120 and spaced outwardly of flange 120 is an integral flange 121 which is cut away below shaft 62 to leave a little more than half of a complete circumference. Inwardly extending cam pins 122 are diametrically opposite each other and adjacent opposite ends of flange 121 so that they may cooperate with the cam faces 117 on flange 116 of cam member 111 and since member 118 is fixed to shaft 62 said shaft has its motion imparted to it by said member 118. A compression spring 123 is coiled about the shaft 62 and seats against the member 118 at one end while the other end of the spring enters and abuts against the end of a counterbore 124 in the sleeve 125 which has its bearing in the bearing boss 60. It will be noted particularly in Fig. 2 that the extreme forward end of sleeve 125 carries an end collar 126.

Fixed on the forward face of cam member 118, viz: on the face opposite flange 121 is an attached or integral lug 127 which has a guide stud 128 extending therefrom.

A disc 129 on the sleeve 125 surrounds the spring on shaft 62 and has a diametrically extending slot 130 cut approximately half-way through its thickness. This slot 130 is of a width to slidably receive the lug 127 when member 118 and shaft 62 are moved forwardly against the resistance of spring 124 at which time rotary movement of shaft 62 is imparted to disc 129. The disc 129 has an upstanding lug 131 with a hole therein in which guide stud 128 extends at all times and in which said stud is also reciprocable as the member 118 is reciprocated. (See Figs. 1 and 2.)

When the lug 127 is pressed forwardly by bodily movement with member 118, to seat in that part of slot 130 which is above shaft 62 the guide stud 128 passes entirely through lug 131 and disc 129 and projects beyond the same.

The disc 129 has a projecting pin 132 extending radially therefrom at 90° from the lug 131. The bearing boss 60 has a flange 133 extending alongside the adjacent face of disc 129 and this flange has fixed stop pins 134 and 135 which limit the oscillatory movement of disc 129. At the top of flange is a slot 136 into which the guide stud 128 may reciprocate when pin 132 is held midway between stop pins 134 and 135 by inserting a threaded member 136a through a hole 137 in flange 133 and a hole in disc 129. This adjustment is made for generating teeth on a rip saw and reference is made to Fig. 22 for a showing of the parts in operative relation for that work.

On either side of slot 136 are bores 139 and 140 respectively centered on an arc so that guide stud 128 may move into and out of the same in the operation cycles employed in generating cross-cut saw teeth. (See Fig. 1.)

The device utilizes a cutting wheel 67 having a double bevel edge with a 60° included angle for generating the teeth on both cross-cut saws and rip saws of any number of points per inch. Reference is made to Figs. 18 to 20 inclusive for a disclosure of the means preferably employed periodically for dressing the wheel to restore the sharp edge of the angle of the wheel.

On the top of bracket 63 are two upstanding fixed studs 141 upon which is removably seated a block 142 having sloping spaced apart sides at 60° one to the other. On the sides 143 are pivoted arms 144 which carry wheel dressing diamonds 145 thereon so that said dressing diamond points are moved through substantially straight line at 60° to each other or parallel to the desired faces of the wheel 67. The actual arcs of this movement of the points of each diamond 145 will lie in planes 30° from the plane of a diameter of shaft 62. The apex of the 60° angle on the wheel 67 will always remain in the same plane with relation to said shaft under repeated truing operations. Said truing device also serves as a means to test the adjustment of replacement abrasive wheels when required.

At this juncture it is to be noted as the diameter of a wheel 67 is slightly reduced, due to dressing the wheel after completing a number of saws, the reduction in wheel diameter is compensated by shifting table 38 a corresponding distance on its guides 35 by manipulating the screw 39. The operator is thus always assured of a proper depth of entry of wheel 67 into the work.

Figures 21, 22:
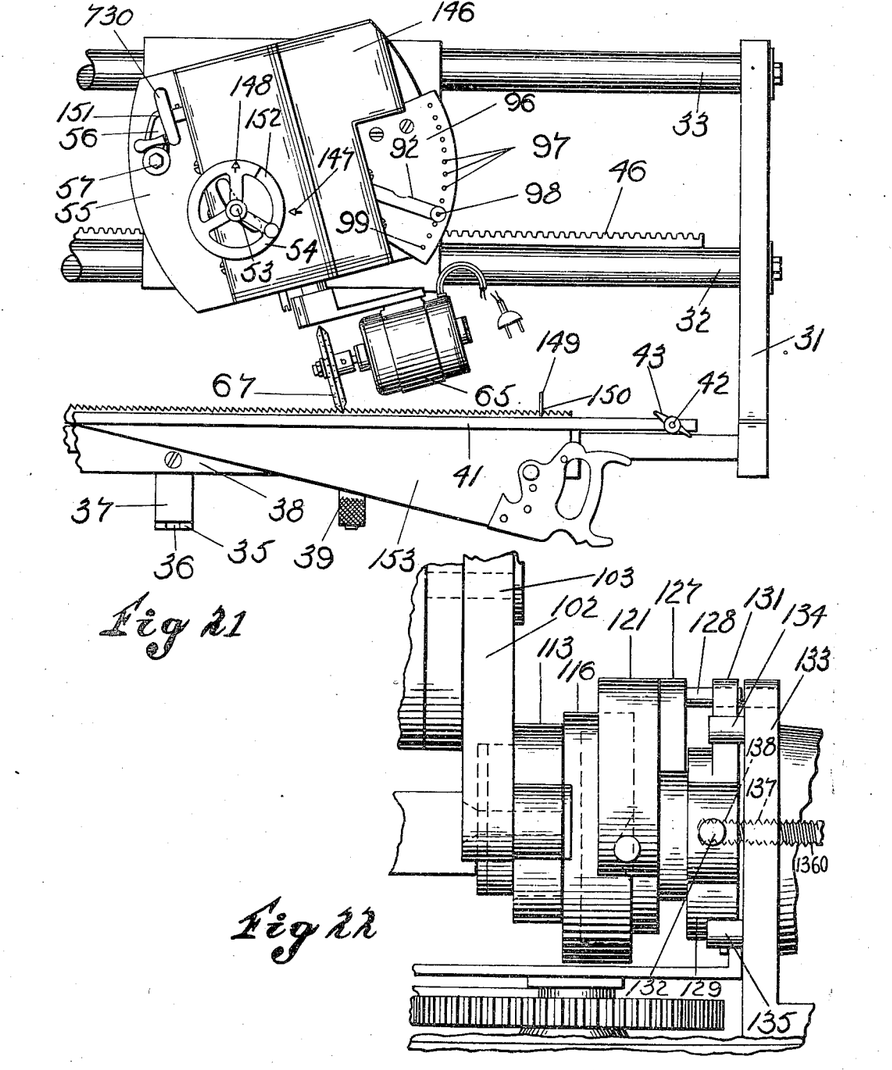
Fig. 21 is a top plan view of the machine of the invention showing a hand saw in position therein, parts being broken away.
Fig. 22 is a fragmental elevational view with the parts corresponding in position to those of Fig. 3 and showing in operative position the means for generating teeth on a rip saw.

Reference is now made to Fig. 21 wherein a suitable removable cover member 146 is mounted over the hereinbefore described mechanism. This cover member assumes a predetermined position on swivel base 55 leaving exposed and accessible the hand wheel 54 and the tooth spacing adjustment lever 92 and its cooperating selector or index plate 95. The cover carries a suitable marker 147 and the hand wheel 54 carries a corresponding similar marker 148 for use in attaining a predetermined location of the carriage lengthwise of its guides and its feed rack 46 and to which location the carriage can be returned at any time the machine is adjusted with swivel base 55 clamped at the angle shown in Fig. 21. A movable or removable guide 149 has a definite location on the front of table 38 and has a wedge shaped point 150 enabling repeated insertion of successive saws with uniform location lengthwise of the table by matching a selected gullet or notch on the saw with the point 150 and then moving the member 149 away after clamping the saw in position. The guide 149 is so positioned relative to the right-hand end of the machine and the manual carriage travel pinion, its shaft and hand wheel 54 are so related with feed rack 46 that when the carriage is moved to approximately the righthand end of the machine and the hand wheel 54 is turned until marker 148 registers with marker 147 on the casing, the edge of wheel 67 will exactly enter the notch of the saw which was matched with point 150. This is used for all cross-cut saws.

In making or reconditioning a rip saw, stud 57 is released and the swivel base 55 is turned until said stud 57 is located in the end 151 of slot 56. The guide 149 is again used but the hand wheel 54 is adjusted with a distinctive marker 152 to compensate for the arc of movement of the edge of the wheel when the swivel base was adjusted.

The operation of the device will be described first as employed in generating cross-cut teeth in a saw blank or for reconditioning a cross-cut saw, following which the operation of the device for manufacturing or reconditioning rip saws will be described.

In preparing to adjust the machine for generating teeth on a cross-cut saw the swivel base 55 is adjusted to the position shown in Fig. 21 wherein it is at an angle with relation to the carriage 44 of approximately 15°. The axis of shaft 62, being at right angles to the swivel base, will therefore be at the same angle with relation to the front line of carriage 38 and its clamp bar 41. The pitman 102 is connected to the outermost bore in power disc 71 to attain a minimum stroke thereof and a maximum oscillation of arm 113 by said pitman. The lever 92 is now adjusted over the tooth selector plate 96 and the pin 98 of said lever is entered into the bore 97 corresponding with the selected number of tooth points per inch to be generated on the saw. With clamp nuts 43 released and clamp bar 41 raised, saw 153 is inserted beneath it with the actual or proposed point line of the saw teeth parallel with the face of the bar 41. The saw is now adjusted lengthwise in order to locate the wedge-point 150 of the removable guide 149 in a selected tooth or notch near the handle end of the saw, whereupon the clamping nuts 43 are drawn tightly and the removable guide 149 is taken away from its position shown in Fig. 21 so as to clear the wheel 67. When hand-wheel 54 is now rotated to shift the carriage to or approximately to the righthand end of the machine and the markers 147 and 149, on the cover and handwheel 54, respectively, are brought into registry, the edge of wheel 67 can be made to accurately enter the tooth notch which was adjusted to the removable guide 149. After now making certain that removable threaded member 136 (see Fig. 22) has been fully withdrawn from disc 129, motors 65 and 69 may be energized. Should it be desired to test the accuracy of the adjustment, the cutter unit motor 65 may remain de-energized, or it may be allowed to operate at the endmost tooth of the saw to test the adjustment for the depth of the tooth, viz., the gullet, which will be formed by the cutting agent 67. Any adjustment of the depth of the tooth to be generated is effected by bodily shifting the table 38 by rotating screw 39. Having made all adjustments and having positioned the carriage so that wheel 67 will engage the first tooth notch in saw 153, action is initiated whereupon wheel 67 is continuously rotated by motor 65, while motor 69 continuously rotates disc 71. The pitman stroke imparts a rocking movement to crank arm 113 which in turn oscillates cam member 111. The spring 123 urges member 118 up against member 111 so that the pins 122 remain seated within the grooves between cam faces 117 so that member 118 rotates with member 111 so long as spring 123 exerts a superior force. During this rotation, the pin 128, which is moving with member 118, carries disc 131 with it, and the shaft 62, which is fixed with member 118, is also rotated with it (see Fig. 2). When, however, pin 132 in the disc 129 engages the stop pin 135, the continued rotational movement of cam member 111 unseats pin 122 by causing it to ride over the cam face 117 to the top flat portion of flange 116. In doing this, the force of cam member 111 has been effective to longitudinally shift member 118, shaft 62 and all of the associated parts against the resistance of spring 123. During this longitudinal shifting there is no rotary movement of shaft 62. Pin 128 at this time is free to enter into the bore 140 where it serves to positively preclude any of the rotational movement of shaft 62 while the latter is undergoing axial movement. When pin 122 has travelled over one of the top flat portions of the flange 116 and it again rides down one of the cam faces 117, the shaft 62, member 118 and all associated parts are free to be pushed back under the action of spring 123. This affords an axial retraction of shaft 62 and its associated parts. In the action thus far described which, incidentally, has included but one-half cycle of cam member 111, the cutter wheel 67 was first rocked to a definite angular position as defined by the engagement of pin 132 against stop pin 135, was then projected into the work while being retained against rocking movement and cutting away its profile into the edge of the saw during the interval in which it was fed into the work. On continued rotation of disc 71, the crank arm 113 moved in the opposite direction and imparts a corresponding movement to the cam member 111. The pins 122 again remain seated between cam faces 117 while pin 132 is rocked from approximately horizontal position upwardly and engages stop pin 134. During this rotative movement of shaft 62, wheel 67 was again bodily rocked about an axis which is a continuation of an axis of shaft 62 until a plane of a diameter of the wheel reaches a corresponding angle on the other side of vertical. Reference is made to Fig. 23 wherein the wheel 67 is shown in section in the two angularly tilted positions. The spacing mechanism which is synchronized to bodily advance the carriage, and hence the shaft 62, a predetermined distance during the interval in which the shaft 62 is oscillating in a given direction while in a retracted position. Hence an imaginary line 154 which contains the axis of shaft 62 and a constant horizontal diameter of wheel 67 will on each forward reciprocation engage midway the thickness of the blade 153 and at successive points along it as defined by the adjustment of the tooth spacing mechanism. The point of a given saw tooth is generated at each feed stroke of the shaft, and as can be readily appreciated by an inspection of Fig. 23, the characteristic face angles on the cross-cut saw teeth are generated by the alternate tilting of the wheel intermediate each power stroke of shaft 62. Reference is made to Figs. 6, 12 and 14 from which it should be apparent that the pin 75 controlling the space feed and the movement of toothed wheel 88 is held at its extreme outer position, riding on the top flat portion of flange 72, thus holding the toothed wheel, and with it the carriage 44, during that interval in which cam member 111 is effecting the reciprocating movement of shaft 62. In the ensuing interval during which pin 75 is being moved over cam faces 74 for releasing toothed pawl 89, and retracting link 81, cam member 111 is imparting its rotary movement to shaft 62 and is thus effecting the angular adjustment or tilting of the wheel 67. It should be further apparent that due to the action of pin 132 between stop pins 134 and 135 and to the movement of pin 128 into the bores 139 and 140, respectively, there is an integrated locking of the mechanism against oscillatory movement of shaft 62 during the infeed reciprocatory movement of shaft 62. The carriage which controls the stepwise positioning of shaft 62 which is likewise positively arrested while said reciprocating feed stroke takes place. The other feed movement under the action of link 81 and toothed pawl 89 takes place during the tilting movement and the retracting movement of wheel 67.

It is to be obvious, however, that adjustments of the tooth-spacing selector lever 92 may be made at any time whether the machine is in operation or not since, as hereinbefore fully explained, the shifting of lever 92 merely determines the extent to which pin 94 will permit the pawl-carrier 84 to retract under the influence of spring 80. Such adjustment is, in final analysis, a mere selection of the distance from a given forward position to which the toothed pawl 89 may be retracted relative to toothed wheel 88.

In generating the teeth on a rip saw, the pitman 102 has its pin 103 inserted in the bore 105 of disc 71, thus assuring a shorter stroke of the pitman and a shorter rocking movement of crank arm 113 and the cam member 111 affixed thereto. The swivel base 55 is released from its clamp nut 57 and swung about at a somewhat greater angle which, as can be readily appreciated from an inspection of Fig. 24, will accommodate the beveled faces of wheel 67 to the desired angle between the teeth of a rip saw. The clamp nut 57 is tightened to hold the swivel base in this adjusted position, after which the mechanism is adjusted by means of hand-wheel 730 until pin 132 extends in a horizontal position permitting the threaded lock pin 1360 to be entered through flange 133 and into disc 129. (See Fig. 22.) At this same time pin 128 is aligned with slot 136 (see Fig. 9) by locking disc 129 against rocking movement. It will now be appreciated that the rotary movement of power disc 71 and the rocking movement of cam 111 by crank 113 through the shorter crank throw will result in restricting the movement of shaft 62 to reciprocatory movement only, and it will be further appreciated that the major diameter of the wheel 67 will be retained in a vertical plane. The initial adjustment of a rip saw on the work table will include the selection of one of the rearmost teeth for alignment of the wedgepoint 150 on member 149 and the adjustment of marker 147 with marker 152 on hand-wheel 54 when the carriage is at approximately its extreme right hand position. When the motors are energized and the desired tooth spacing is selected by the adjustment of lever 92, the mechanism will be constrained to intermittently reciprocate shaft 62 to feed in and withdraw the wheel 67 with relation to the adjusted edge of the saw while the carriage feed mechanism actuates the carriage and effects stepwise longitudinal movement of the wheel during the intervals in which the wheel is in its retracted position relative to the work.

With the mechanism of the invention, the successive feed strokes of the shaft 62 always feed the wheel 67 so that its opposed beveled faces each generate a front angle and a rear angle, respectively, of adjacent teeth and impart the corresponding profile to the teeth. If a blade blank be inserted in lieu of a saw, the wheel may be obviously used to generate the complete tooth. If a saw requiring reconditioning is at hand, the lever 92 is adjusted to set up a tooth feed corresponding to the existing number of points per inch on the saw after which, upon proper adjustment of the saw on the work table, wheel 67 will progressively generate the desired faces on the teeth with machine precision so that no further operations are required and the saw is ready for use.

What is claimed is:

1. In a universal saw tooth generating machine for saws the combination of a supporting frame, a saw holding table on said frame adapted for limited adjustment laterally of the frame, a carriage movable longitudinally of the frame and parallel with the table, a swivel base on the carriage adjustable in a horizontal plane on said carriage about a vertical center on said carriage, a shaft mounted horizontally on the swivel base with its axis disposed in a horizontal plane which bisects the edge thickness of a saw on the saw table, a cutter unit mounted on the end of the shaft adjacent the table and comprising a rotary double bevel edge cutting agent having its horizontal diameter aligned with the axis of said shaft, a power driven rocker cam mechanism, a complementary cam member fixed on the shaft, means yieldably urging said cam into rotatable driven relation with the rocker cam mechanism for imparting oscillatory movement to said shaft, stop means arresting oscillatory movement of the shaft in advance of each rocking movement of said rocker cam mechanism whereby the cutting agent is tilted to predetermined angles about a diameter which is aligned with the axis of said shaft, continued rocking movement of the rocker cam mechanism serving to move the complementary cam member away and out of rotatable driven relation and to effect axial power movement of said shaft toward the table, and means operating synchronously with said power driven cam for effecting selected tooth spacing movement of said carriage after each axial power movement of said shaft.

2. In a universal saw tooth generating machine for saws the combination of a supporting frame, a saw holding table on said frame adapted for limited adjustment laterally of the frame, a carriage movable longitudinally of the frame and parallel with the table, a swivel base on the carriage adjustable in a horizontal plane on said carriage about a vertical center on said carriage, a shaft mounted horizontally on the swivel base with its axis disposed in a horizontal plane which bisects the edge thickness of a saw on the saw table, a cutter unit mounted on the end of the shaft adjacent the table and comprising a rotary double bevel edge cutting agent having its horizontal diameter aligned with the axis of said shaft, a power driven rocker cam mechanism, a complementary cam member fixed on the shaft, means yieldably urging said cam into rotatable driven relation with the rocker cam mechanism for imparting oscillatory movement to said shaft, stop means arresting oscillatory movement of the shaft in advance of each rocking movement of said rocker cam mechanism whereby the cutting agent is tilted to predetermined angles about a diameter which is aligned with the axis of said shaft, continued rocking movement of the rocker cam mechanism serving to move the complementary cam member away and out of rotatable driven relation and to effect axial power movement of said shaft toward the table, insertable means to hold said shaft against oscillatory movement whereby the cutting agent is constantly held against tilting movement, and means operating synchronously with said power driven cam for effecting selected tooth spacing movement of said carriage after each axial power movement of the shaft.

3. In a universal tooth generating machine for saws, the combination of means fixedly holding a saw blade, a carriage movable parallel thereto, a main shaft supported on said carriage with its axis constantly disposed in a plane bisecting the edge thickness of a saw blade on said holding means, an independently power driven cutter unit supported fixedly on the end of the shaft and comprising a rotary cutting agent having a major diameter aligned with the axis of said shaft, a motor driven power disc in axial parallelism with said shaft, a face cam on one side of said disc, adjustable carriage spacing mechanism driven thereby, a pitman connected on the other side of said disc, a rocker cam mounted on said shaft for actuation by said pitman, a complementary cam fixed on the shaft, means yieldingly urging the complementary cam against the rocker cam for yieldingly urging the shaft axially away from said saw holding means and imparting oscillatory movement of the rocker cam to said shaft so long as the shaft is free to turn, means limiting oscillatory movement of the shaft in opposite directions whereby the cutting agent is tilted to predetermined angles with respect to the saw holding means, whereupon, on continued movement, the rocker cam positively moves the complementary cam against the resistance of the yieldably urging means and imparts axial movement to the shaft in the direction of the saw holding means, and means positively holding the shaft against oscillatory movement during continued movement of said rocker cam.

4. Saw tooth generating mechanism comprising a movable carriage, power means effecting stepwise spacing movement thereof, lever controlled means for selectively varying said spacing movement means to hold a saw parallel to the path of movement of the carriage, a shaft supported on the carriage and arranged for oscillatory and reciprocatory movement, a cutter unit supported on the end of the shaft and comprising a double beveled rotary cutting agent having a major diameter aligned with the axis of said shaft, and means operating synchronously with said carriage spacing means for moving said shaft axially toward the saw holding means and retracting said shaft from said holding means while said carriage is at rest, and for oscillating said shaft to a predetermined degree in opposite directions respectively intermediate said reciprocatory movements of said shaft and during successive spacing movements of the carriage.

5. Universal saw tooth generating mechanism comprising a main shaft, power driven means to impart uniform positive axial reciprocatory movement thereto, a cutter unit mounted on the end of the shaft and comprising a double bevel edged rotary cutting agent having a major diameter thereof at all times aligned with the axis of said shaft, means to fixedly hold a saw in the path of said cutting agent in position such that the extended line of the axis of the shaft will bisect the edge thickness of the saw, power driven means intermittently operable synchronously with the shaft reciprocating means to automatically impart uniform stepwise bodily movement to the shaft, and lever controlled means to selectively vary the uniform stepwise bodily movement of the shaft.

6. In a saw tooth generating machine the combination of a supporting frame, a carriage guidedly supported for longitudinal rectilinear movement thereon, a saw holding table disposed on said frame in parallelism with the line of movement of said carriage, a base supported on the carriage, a shaft mounted on the base with its axis disposed in a plane parallel with the top of said table, a cutter unit fixedly mounted on the end of the shaft and comprising a rotary double bevel edged cutting agent having a diameter aligned with the axis of said shaft, a rotating power disc, a cam on one face thereof, a pitman pivoted to the other face of said power disc, a crank arm freely rotatable on said shaft and pivotally connected at its free end to said pitman, a rocker cam secured to said crank arm concentrically with said shaft, a complementary member fixed to the shaft and having a pin adapted for cooperation with said rocker cam, means yieldingly urging the shaft and said complementary member toward said rocker cam whereby the shaft receives oscillatory movement from the rocker cam, means to arrest oscillatory movement of the shaft under the influence of the rocker cam in advance of the completion of rocking movement of the cam, whereby the continued rocking movement of the cam imparts axial movement to the shaft against the resistance of said yielding means, and means comprising a pawl and coacting pawl wheel and actuated by the cam on said power disc for effecting stepwise selected spacing movements of the carriage intermediate the axial movements of the shaft against the resistance of said yielding means.

7. In a saw tooth generating mechanism the combination of a carriage, a swivel base thereon adjustable in a horizontal plane about a fixed vertical center on the carriage, a shaft supported on said swivel base and having its axis at all times in a horizontal plane above the carriage and intersecting the vertical axis of adjustment of the swivel base on the carriage, yieldably engaged power driven means to impart selected rocking movement to said shaft in opposite directions, means cooperating therewith for arresting said rocking movement and causing said yieldably engaged power driven means to impart limited axial movement of the shaft, complementary means positively precluding rocking movement of the shaft during axial movement thereof, and tooth spacing means for shifting the carriage predetermined selected distances during the rocking movement.

8. Saw tooth generating mechanism comprising a movable carriage, means effecting selected spacing movement thereof, means to hold a saw parallel to the path of movement of the carriage, a shaft supported on the carriage and arranged for oscillatory and reciprocatory movement, a cutter unit fixed on the end of the shaft and comprising a double beveled rotary cutting agent having a major diameter in a common plane with the axis of said shaft, means operating synchronously with said carriage spacing means for moving said shaft axially toward the saw holding means and retracting said shaft from said holding means while said carriage is at rest, and for oscillating said shaft to a predetermined degree in opposite directions respectively intermediate said reciprocatory movements of said shaft and during successive spacing movements of the carriage, and means supporting said shaft on said carriage adjustable about an axis which is perpendicular to the carriage and which intersects the axis of said shaft whereby the angle of entry of the rotary cutter into the saw is varied to produce desired front angles on the teeth generated on the saw.

9. In a universal saw tooth generating machine the combination of a saw holding table, a shaft support disposed transversely of and travelable in a path parallel with the front edge of said table, said support having an axis about which it is selectively adjustable said axis disposed at all times in the plane of the path of travel, a shaft reciprocable and oscillatable in the support and having its axis at all times in a plane parallel to the top face of the table, synchronized power means to simultaneously impart stepwise travel to said shaft support and oscillatory movement to the shaft and to impart axial movement to the shaft intermediate the stepwise movements of said support, and a continuously operating cutting unit on the shaft comprising a rotating double beveled cutting agent having a major diameter at all times in non-angular relation to the plane of the axis of the support and the axis of the shaft.

10. A universal saw tooth generating machine comprising a saw holding table, a shaft support disposed in spaced relation to the front edge of the table, a power means, means driven by said power means to move the support intermittently and uniformly in stepwise relation in a path parallel to the front of the table, a shaft mounted for oscillation and reciprocation in said support and having its axis at all times in a plane parallel to the table top, means driven by said power means for successively imparting alternate oscillatory and reciprocatory movement to the shaft, means to angularly adjust said support to vary the angle of the axis of the shaft with relation to the front edge of the table, and a rotary cutting unit on the shaft for operating on a saw on said table during the reciprocatory movement of the shaft.

ELMER W. CHRISTY.
WILLIAM S. DICKSON.

CERTIFICATE OF CORRECTION.

Patent No. 2,329,879.　　　　　　　　　　　　　　September 21, 1943.

ELMER W. CHRISTY, ET AL.

It is hereby certified that error appears in the above numbered patent requiring correction as follows: In the grant, line 3, and in the heading to the printed specification, line 5, residence of inventor, for "Hamilton, Ohio" read --Cincinnati, Ohio--; and that the said Letters Patent should be read with this correction therein that the same may conform to the record of the case in the Patent Office.

Signed and sealed this 23rd day of November, A. D. 1943.

(Seal)　　　　　　　　　　　　　　　　　　Henry Van Arsdale,
　　　　　　　　　　　　　　　　　　Acting Commissioner of Patents.